(12) United States Patent
Gehris

(10) Patent No.: US 8,365,395 B2
(45) Date of Patent: Feb. 5, 2013

(54) TABLES FOR ASSEMBLING COMPOSITE PANELS

(75) Inventor: Michael E. Gehris, Mohrsville, PA (US)

(73) Assignee: Reading Truck Body, LLC, Reading, PA (US)

( * ) Notice: Subject to any disclaimer, the term of this patent is extended or adjusted under 35 U.S.C. 154(b) by 304 days.

(21) Appl. No.: 12/856,921

(22) Filed: Aug. 16, 2010

(65) Prior Publication Data

US 2012/0036705 A1   Feb. 16, 2012

(51) Int. Cl.
*B23P 19/00* (2006.01)
*B23Q 3/00* (2006.01)

(52) U.S. Cl. ..................... 29/822; 269/289 R

(58) Field of Classification Search ............... 29/464, 29/559, 458, 428, 822; 269/289 R
See application file for complete search history.

(56) References Cited

U.S. PATENT DOCUMENTS

| | | | |
|---|---|---|---|
| 4,295,914 A | 10/1981 | Checko | |
| 5,246,331 A | 9/1993 | Hallahan et al. | |
| 5,328,540 A | 7/1994 | Clayton et al. | |
| 6,279,716 B1 | 8/2001 | Kayatani et al. | |
| 6,786,318 B1 * | 9/2004 | Pace et al. | 193/35 SS |
| 8,011,307 B2 * | 9/2011 | Marcelli | 108/55.3 |

* cited by examiner

*Primary Examiner* — John C Hong

(74) *Attorney, Agent, or Firm* — Fox Rothschild LLC

(57) ABSTRACT

A system for use in a manufacturing process comprises a series of tables with clamping and conveying/lowering mechanisms. The tables are arranged to facilitate alignment of successive composite dry freight panels. Tables may include a plurality of transfer mechanisms, such as ball rollers, to assist an operator in moving the panels into place. Once a new panel is in place, the rollers may be pneumatically or mechanically lowered to form a new joint. A clamping mechanism can be used to secure the new joint with adhesive.

20 Claims, 5 Drawing Sheets

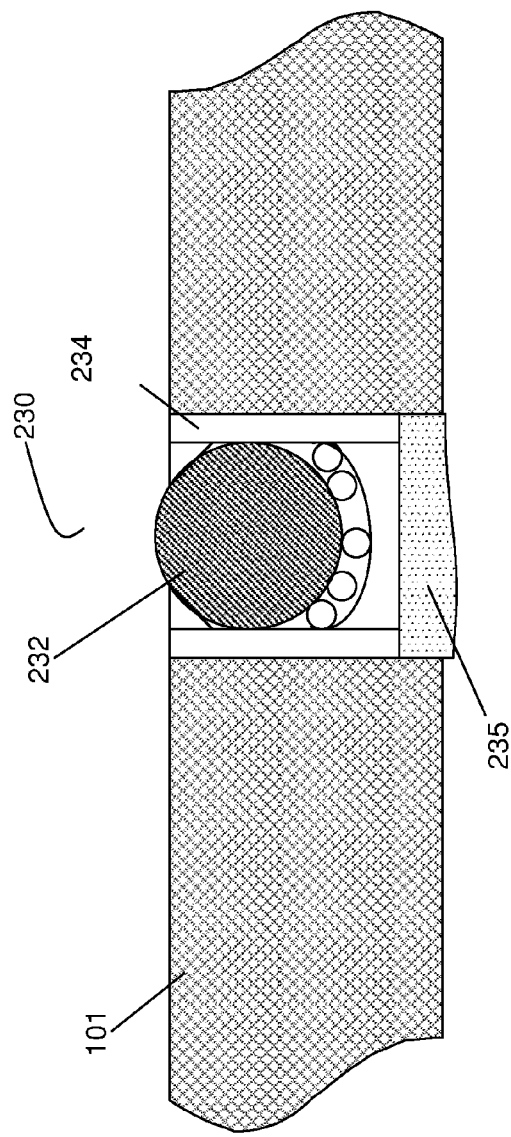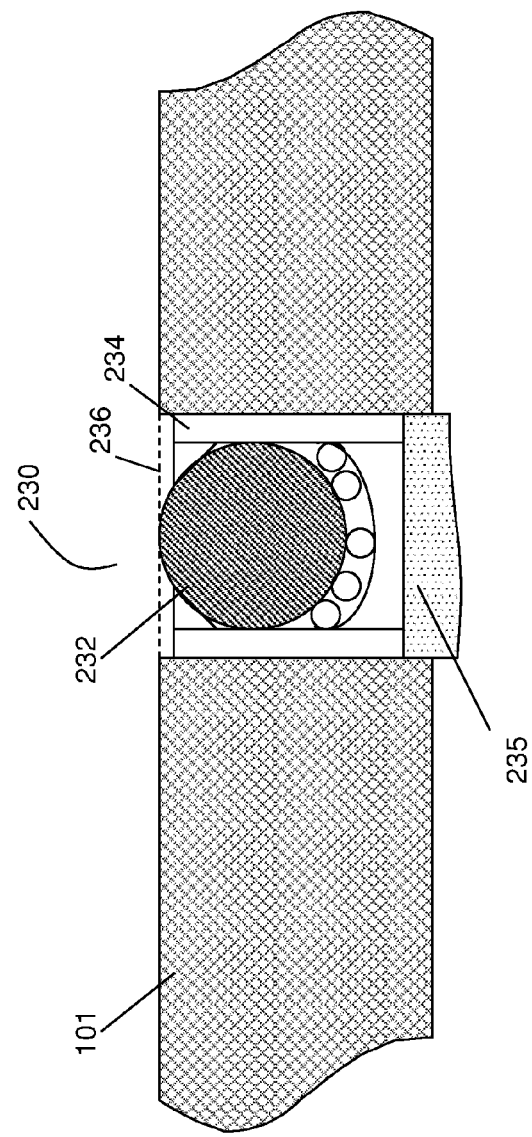

TABLES FOR ASSEMBLING COMPOSITE PANELS

BACKGROUND

The disclosure below relates generally to manufacturing equipment and more particularly, to systems for assisting in the manufacture of composite dry freight panels or the like, and methods for assembling the same.

Dry freight trucks and trailers typically include composite wall panels in the cargo area. Composite wall panels are advantageous to the construction of the truck because they allow easy, uniform assembly of the walls in the freight area. Typically, the composite panels are approximately 48 inches wide and can be any height between 76 inches and 106 inches depending on the desired application. An exemplary composite dry freight panel includes two parallel metal plates, such as galvanized steel, with a lightweight core, such as high-density polyethylene, in between.

A common way to join adjacent composite panels is by a ship lap joint. Each panel includes a lip formed by one of the metal plates that extends past the core of the panel. The overlapping lips of two adjacent panels can be secured to the panels by an adhesive such as caulk and/or double-sided tape. To ensure that the ship lap joint has uniform quality, the lips of the two adjacent panels are often pretreated with adhesive. This can make the process of aligning adjacent panels before forming a ship lap joint difficult.

A common method for aligning panels before forming a ship lap joint is to have at least two people carefully carry the panel and lay it in place before the lips of adjacent panels come in contact with the panels. This process is labor intensive and can be prone to errors if the panels come in contact before properly aligned.

SUMMARY

Embodiments described below address and overcome one or more of the above shortcomings and drawbacks, by providing methods and systems for allowing an operator to position panels using a retractable conveying or roller system such that panel edges can be lined up before a panel is lowered to form a bond. Once positioned, a clamping structure can be applied to the joint to ensure a strong cure and continue adding successive panels to form a wall.

In an embodiment, a manufacturing system includes a primary table having a corner guide and a plurality of secondary tables that include retractable rollers and at least one clamping element. The secondary tables may be arranged such that panels can be moved by the retractable rollers and positioned such that each table can receive and support at least one panel; joints between the panels are formed when at least a subset of the of retractable rollers are lowered.

According to another embodiment, a manufacturing system includes at least a first and a second table, each having conveying systems in their surfaces. The tables are arranged to allow panels to move from the first to the second table, to align successive panels, and to receive additional panels. The conveying systems include a first state, whereby the panels can be conveyed above the surface of the table, and a second state, whereby the panels rest on the surface of the table. When the conveying system of the first table transitions to the second state, a panel is lowered to become substantially flush with another panel to form a joint.

Optionally, a clamping mechanism may include a clamping bar that may be bowed to apply a substantially uniform clamping force to the joint along the length of the clamping bar.

According to another option, a lift table may be used to supply panels at substantially the same height as the plurality of assembly tables.

According to another option, adjacent assembly tables may be arranged to allow access spaces between the tables and such that the center of gravity of a panel being moved rests on the conveying system/retractable rollers until it is lowered to form a joint.

According to yet another option, the conveying system/retractable rollers may be controlled by a foot switch at each assembly table. In some embodiments, the switch manipulates a pneumatic or hydraulic pressure to retract or enable the conveying system/retractable rollers.

According to a further aspect of the invention, the assembly tables may each include an edge guide to assist in aligning the panels.

According to another embodiment, a method for assembling a plurality of panels includes moving a first panel across a first and second assembly table, each including a retractable transfer mechanism, and retracting a first retracting transfer mechanism to rest the first panel on the second table. A second panel is then moved across the first assembly table to align a leading edge with an edge of the first panel and lowered to form an adhesive joint between the first and second panel by retracting the second retractable transfer mechanism. A bar is then secured over the joint to exert a pressure on the joint between the bar and the table.

The process may be repeated on other tables for successive panels.

Additional features and advantages will be made apparent from the following detailed description of illustrative embodiments that proceeds with reference to the accompanying drawings.

BRIEF DESCRIPTION OF THE DRAWINGS

The foregoing and other embodiments are best understood from the following detailed description when read in connection with the accompanying drawings. For the purpose of illustrating embodiments described below, the drawings show embodiments that are presently preferred, it being understood, however, that the invention is not limited to the specific instrumentalities disclosed. Included in the drawings are the following Figures:

FIG. 5A is a cutaway side view illustrating a first roller mechanism in a first enabled state in accordance with certain embodiments;

FIG. 5B is a cutaway side view illustrating a first roller mechanism in a second retracted state in accordance with certain embodiments.

DETAILED DESCRIPTION

The above problems in the prior art have motivated the creation of the manufacturing systems and methods of the present invention. Panels, such as dry freight panels used to form the sidewalls of a truck or other vehicle, can be manipulated on retractable conveying mechanisms, such as rollers. This allows the operator of the manufacturing system to easily move successive panels into place without the adhesive of two panels contacting before both panels are in place. Once the panels are aligned, the conveying system can be retracted to lower the panels into place and form an adhesive joint, such as a ship lap joint.

Figure 1:
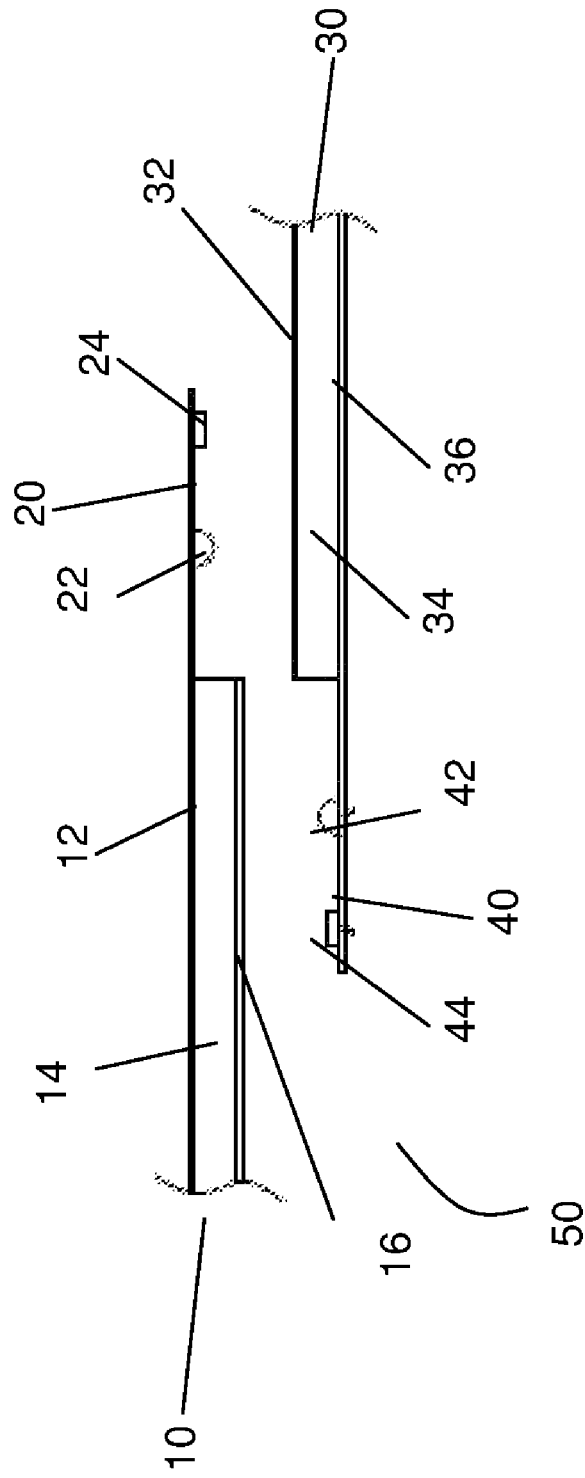
FIG. 1 is a side view illustrating the formation of a ship lap joint between two dry freight panels in accordance with certain embodiments.

FIG. 1 shows an exemplary ship lap joint 50. Two adjacent panels 10 and 30 are aligned such that the panel bodies abut. Exemplary panel 10 comprises an outside galvanized steel plate 12 inner core 14 an inside galvanized steel plate 16. Likewise, panel 30 comprises an outside galvanized steel plate 32, an inner core 34 and an inner plate 36. In some embodiments, plates 12 and 16 can include other materials such as fiberglass, plastics, other metals, or the like. Inner core 14 can include foam, wood, insulation or the like. In an embodiment panels 10 and 30 are composite wall panels that can be used for forming a wall in the freight area of the truck or trailer. In some embodiments, Wabash Duraplate panels are used.

Panels 10 and 30 are preferably the same height, the same width, and the same thickness. However, the exact relative dimensions of panels 10 and 30 can be chosen based on application. For example, in some embodiments, panels 10 and 30 are approximately 4 feet wide and 76 to 106 inches tall, depending on the application.

Panels 10 and 30 are joined by a ship lap joint 50 formed when lip 40 (on the trailing edge of panel 30) is secured to the body of panel 10 and lip 20 (on the leading edge of panel 10) is secured to the body of panel 30. The exact method of securing the lips 40 and 20 to the bodies of adjacent panels can vary depending on the application. In some embodiments, double-sided adhesive foam tape 44 and 24 may be used in conjunction with other adhesives 22 and 42. In some embodiments adhesive 42 and 22 are heat curable adhesives or caulk. In other embodiments adhesives may include contact cement, a heat moldable adhesive, epoxy, or any other adhesive suitable for securing a ship lap joint. In some embodiments, the tape or adhesives are applied prior to assembly step, such that the tape or adhesive is pretreated or applied to the panels before the panels are assembled.

In many applications, a wall will be formed by successively joining dry freight panels. For example, if five four-foot wide panels are joined, these panels can form a 20 foot wide wall with a substantially continuous inner core and substantially continuous inner and outer faces. This wall may then be secured to the frame of the truck or other vehicle, such that the ship lap joints hold the panels together while the frame of the vehicle substantially bears loads.

The system and method described in this application may align panels 10 and 30 such that they squarely abut before pressing lips 40 and 20 to panels 10 and 30 respectively. This ensures proper panel alignment before the adhesives create a bond between the lips and adjacent panels. This further ensures that the resulting wall formed by successively joined panels will be substantially square. Once the lips are adhered to the adjacent panels, pressure may be applied via a clamping mechanism such that a strong and permanent bond is formed.

The assembly tables may allow a single operator to move panels 10 and 30 relative to one another and relative to the tables such that ship lap joints may be aligned. Once adjacent panels 10 and 30 have been aligned relative to one another, a clamping structure, such as a bar, clamp, or clamps, may be applied over the top of the joint to apply pressure to the adhesive and/or tape such that a rigid bond can be formed between lips 20 and 40 and panels 30 and 10, respectively. This pressure can be useful during a curing step of the adhesives 22 and 42, such as chemical curing or heat treatment.

Figure 2:
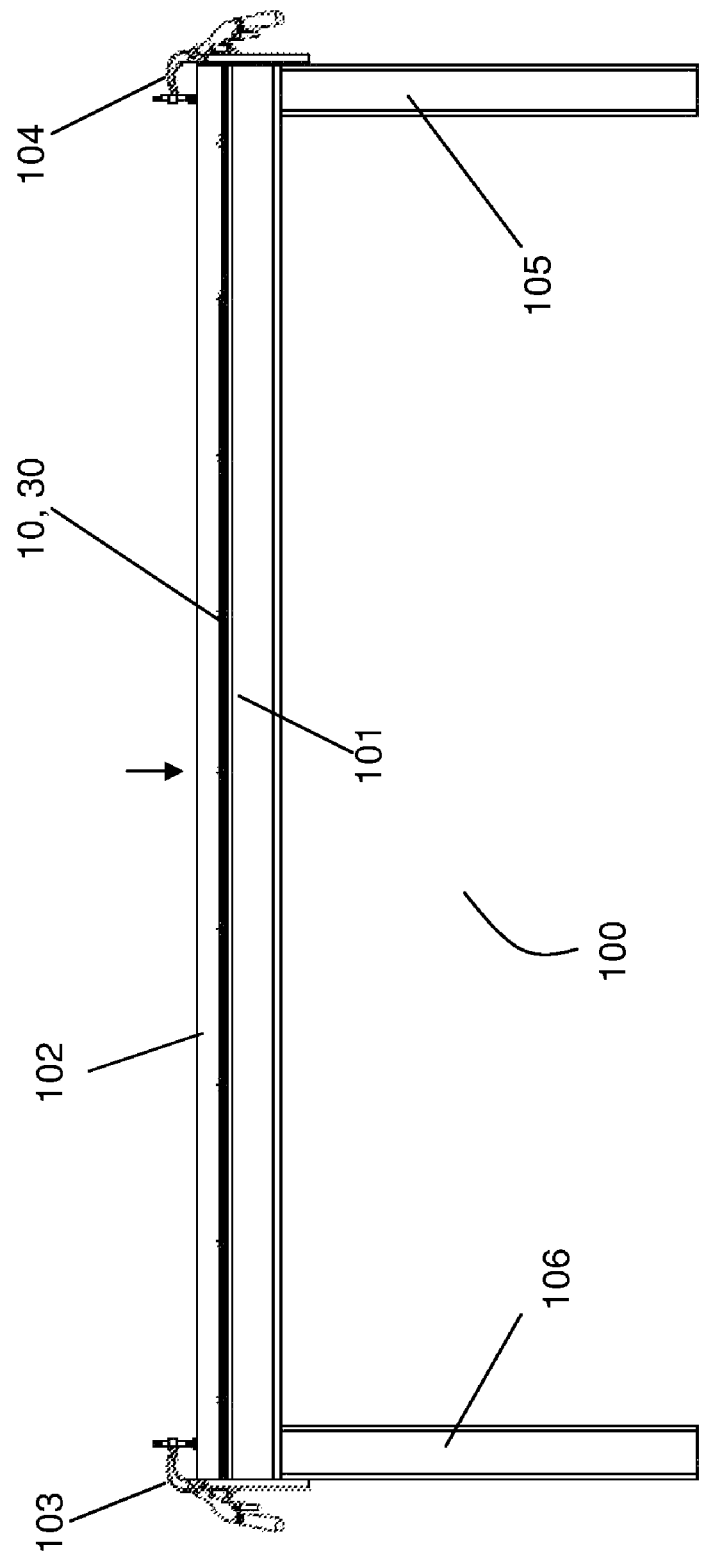
FIG. 2 is a front view illustrating an assembly table in accordance with certain embodiments.

FIG. 2 shows a front view of an exemplary table for use with some embodiments. Assembly table 100 includes a clamping mechanism comprising clamping elements 103 and 104 and clamping bar 102. In some embodiments, this clamping mechanism is integral to the table, whereas in other embodiments, the clamping mechanism, or portions thereof, may be removable.

Clamping bar 102 may be substantially rigid element that is configured to apply pressure along the interface between clamping bar 102 in table surface 101. In some embodiments, clamping bar 102 comprises a rectangular aluminum bar that has been bowed at its centerpoint (indicated by the arrow) in the direction of the table. In some embodiments, the deflection of this bow is approximately 0.25" off of a straight line. In this configuration, clamping bar 102 has spring-like properties, allowing it to apply substantially uniform pressure along the length of the clamping bar when clamped to the table and/or panels by clamping elements 103 and 104. (In this instance, substantially uniform can include a clamping pressure between clamping bar 102 and table surface 101 that exceeds a threshold the clamping pressure needed for curing throughout the length of ship lap joint 50.)

In some embodiments, clamping elements 103 and 104 are clamps, such as woodworking clamps, that can include a screw type clamp, a lever type clamp, a vice grip clamp, or the like. In other embodiments, the elements 103 and 104 may include pneumatic, hydraulic, or electric actuators such that the clamping process can be substantially automated. In yet other embodiments, clamping element 103 may be replaced with a hinge or passive element such as an alignment slot. In this embodiment, an operator only has to adjust clamping element 104 to lock the clamping bar 102 into place.

Assembly table 100 can be constructed in any manner known in the prior art, including for example, a table having legs 105 and 106. In some embodiments assembly table 100 is constructed out of a metal, such as steel. Other configurations of table 100 can include wooden construction, plastic construction, fiberglass, or any other construction method suitable for the application.

Figure 3:
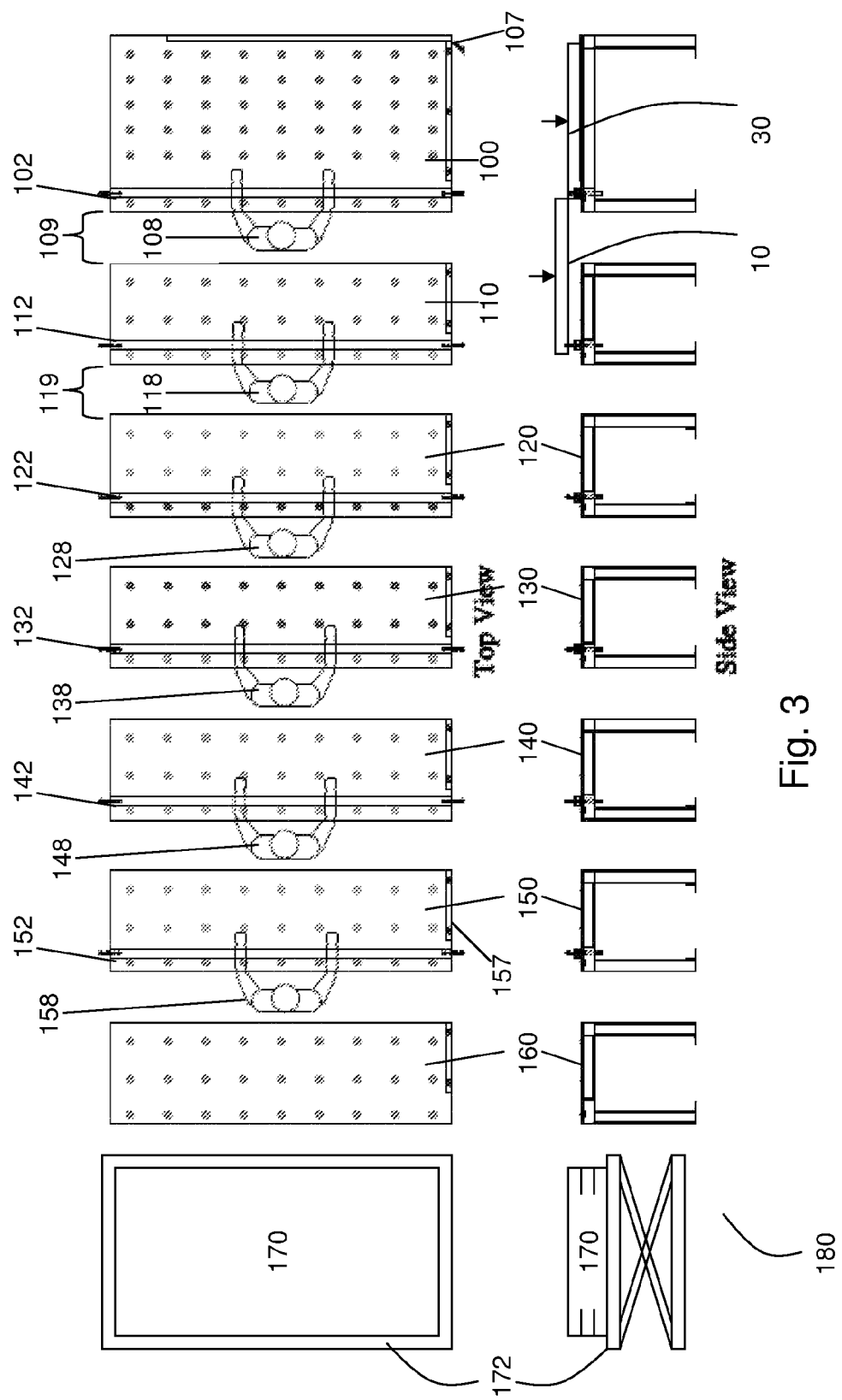
FIG. 3 is a top and corresponding side view illustrating the layout of a plurality of assembly tables in accordance with certain embodiments.

In the example shown in FIG. 3, panels 10 and 30 are laid parallel to table surface 101 (i.e. perpendicular to the page) and the ship lap joint 50 between panels 10 and 30 is placed between clamping bar 102 and table surface 101. When an operator secures clamps 103 and/or 104, such that they provide a force between clamping bar 102 and table 100, the bowed shape of clamping bar 102 supplies pressure along the entire length the ship lap joint 50.

FIG. 3 shows corresponding top and side views for an exemplary embodiment of a manufacturing system 180. Manufacturing system 180 includes a plurality of assembly tables such as table 100. In this embodiment, table 100 acts as a primary assembly table. The remaining tables 110, 120, 130, 140, 150, and 160 are arranged in series and act as secondary assembly tables. By this, applicants mean that the first ship lap joint will be formed on table 100 (at the position of clamping bar 102) after a first panel, such as panel 30 (aligned with corner guide 107 on table 100) joins a second panel, such as panel 10. Successive joints can be formed by subsequent panel abutment on tables 110-150, by moving subsequent panels onto the corresponding secondary tables and aligning ship lap joints at the corresponding clamping bars.

The assembly tables in manufacturing system 180 are arranged such that edge guides, such as edge guide 157, are parallel and substantially in line with a first edge portion of corner guide 107 on the primary assembly table. The back side of corner guide 107 is perpendicular to the edge guides and forms a square corner to align the first/primary panel.

The tables in manufacturing system 180 are further arranged such that access spaces (e.g. walkways 109 and 119) reside between each table to allow a single operator to freely move between the tables as he aligns and secures each successive panel. For example, as the operator moves a first panel from a panel supply 170 to table 100, the operator may stand at position 108 as he finalizes the alignment of the first panel with corner guide 107. In some embodiments, where the panels are not pretreated with adhesive, the operator can use position 108 in walkway 109 to apply adhesives to the trailing edge of the first panel.

As the operator moves a second panel onto table 110 to be aligned with the first panel resting on table 100, the operator may freely move about the walkways 109 and 119 to stand at position 118. For successive panels, the operator may freely move between tables that are not covered in panels such that he may traverse the access spaces or walkways and stand at position 128, 138, 148, and 158. These access spaces or walkways may also be useful to allow a single operator to freely move between clamps to secure clamping bars 102, 112, 122, 132, 142, and 152.

The dots on the tables in FIG. 3 indicate the position of rollers that maybe used in some embodiments. To facilitate the alignment of panels before securing a ship lap joint, the tables shown in FIG. 3 are equipped with a conveying system (sometimes referred to as a transfer mechanism). In some embodiments, the conveying system may include retractable rollers, which may include unidirectional rollers (e.g. ball rollers) as shown in FIG. 3. In other embodiments, the retractable rollers may include wheels, such as caster wheels, or fixed unidirectional rollers, such as wheels or needle/cylindrical rollers. In some embodiments the conveying system used in table can further include in air flotation system, such as the system commonly used on air hockey table. In some embodiments, the conveying system can supply its own motive force, such as by including power to the rollers. In other embodiments, including the conveyor system shown in FIG. 3, the motive force is supplied by the operator pushing or pulling the panel to align it properly.

In some embodiments, the supply of panels 170 includes a lift table 172 that may be hydraulically, pneumatically or electrically adjustable such that a stack of panels can be pulled off the stack 170 at approximately the same height as table 160. (The thickness of the panels in FIG. 3 is not necessarily to scale, as the total thickness of each panel is approximately 0.25" in some embodiments.) The adjustment to the lift table 172 supporting the supply of panels 170 can be manually or automatically adjusted. In other embodiments, the table 172 supporting panel stack 170 can be a passive device, such as a table including springs. The springs and table can be configured such that as each panel is pulled off a stack 170 the entire stack is raised slightly, such that the top of the stack remains approximately the same height as table 160.

An operator can assemble a wall consisting of several panels, including panels 10 and 30 in the following manner. The operator holds a first panel 30 off of stack 170 and rolls it across table 160. The operator proceeds to roll the panel 30 across each successive table until he has rolled the first panel 30 onto primary table 100. At primary table 100, the operator can manipulate the placement of the panel such that it is aligned with corner guide 107. The operator then retracts the conveying system of table 100 while leaving the conveying system of the remaining tables in operation. The retraction of the conveying system of table 100 can be by operation of the a pneumatic foot switch at table 100, such as 204 in FIG. 4. The mechanism and operation of the retractable conveying system at table 100 will be further explained below.

Once the operator has retracted the conveying system at table 100, the first panel 30 now rests on the surface 101 of table 100. Because the conveying system of table 100 has been retracted or deactivated, this first panel 30 is now a substantially fixed in alignment with primary table 100. The operator then retrieves a second panel 10 from stack 170. The operator moves the panel 10 across table 160 and each successive table along the conveying system of each table until the center of gravity (indicated by the arrow) of the second panel 10 is above table 110. The operator then manipulates the position of the second panel 10 such that the leading edge of the second panel 10 substantially abuts the trailing edge of the first panel 30 resting on the primary table. Because the rollers have been retracted on primary table 100, that first panel 30 resting on table 100 rests at a height that is less than the height of the second panel 10. When the first panel 30 in second panel 10 are configured to use the ship lap joint, these two panels are now arranged as shown in FIG. 1.

To form a ship lap joint 50, the operator causes the conveying system of table 110 to retract such that the second panel 10 now rests on the surface of table 110. This causes the lip 20 of the leading edge of the second panel 10 to become substantially flush with the first panel and rest on the body of panel 30. This further causes the body of panel 10 to rest on the lip 40 of the first panel 30. The adhesives and/or tape on the lips begin to bond the two panels in a ship lap joint.

To secure the ship lap joint 50, pressure is needed while adhesives cure or set. The operator supplies pressure to the newly formed ship lap joint by securing a clamping bar 102 over the joint. In some embodiments, the operator must retrieve a clamping bar and place it over the joint before securing clamping elements 103 and 104. In other embodiments, the primary table 100 includes a clamping bar that is integrated into the table and rests above the joint in an unlocked position during the alignment process. In these embodiments, to complete the ship lap joint, the operator lowers the clamping bar 102 after the joint has been aligned. Force is applied to the joint by clamping bar 102 by securing the clamps or actuators.

Once the first ship lap joint 50 is clamped into place on the first table 100, the operator can proceed to retrieve a third panel from stack 170. In substantially the same manner that the operator manipulated the second panel 10 to form the first ship lap joint 50, the operator manipulates this third panel until it is aligned on table 120. The conveying system of table 120 is then retracted and a second ship lap joint is formed between the leading edge of the third panel and the trailing edge of the second panel at the position of clamping bar 112. Once clamping bar 112 has been secured, this second ship lap joint is formed and ready for curing. The operator then repeats the process for each successive panel until a wall of the desired length has been formed. This wall can then be removed from manufacturing system 180 by unclamping the clamping elements and enabling the conveying systems of the tables. This allows the operator to roll the panel off of the tables with minimal effort.

It will be appreciated that the width of each secondary table may be less than the width of the primary table. It will be further appreciated that the width of each secondary table plus the width of the access spaces or walkways between the secondary tables may be substantially the same as the width of each panel. Furthermore, in some embodiments, each secondary table is substantially wider than each access space or walkway. In these embodiments, the relative width of the tables and walkways allows the center of gravity of each successive panel to be supported by an operating conveying system as that panel is aligned such that its leading-edge abuts the trailing edge of the panel before it.

Figure 4:
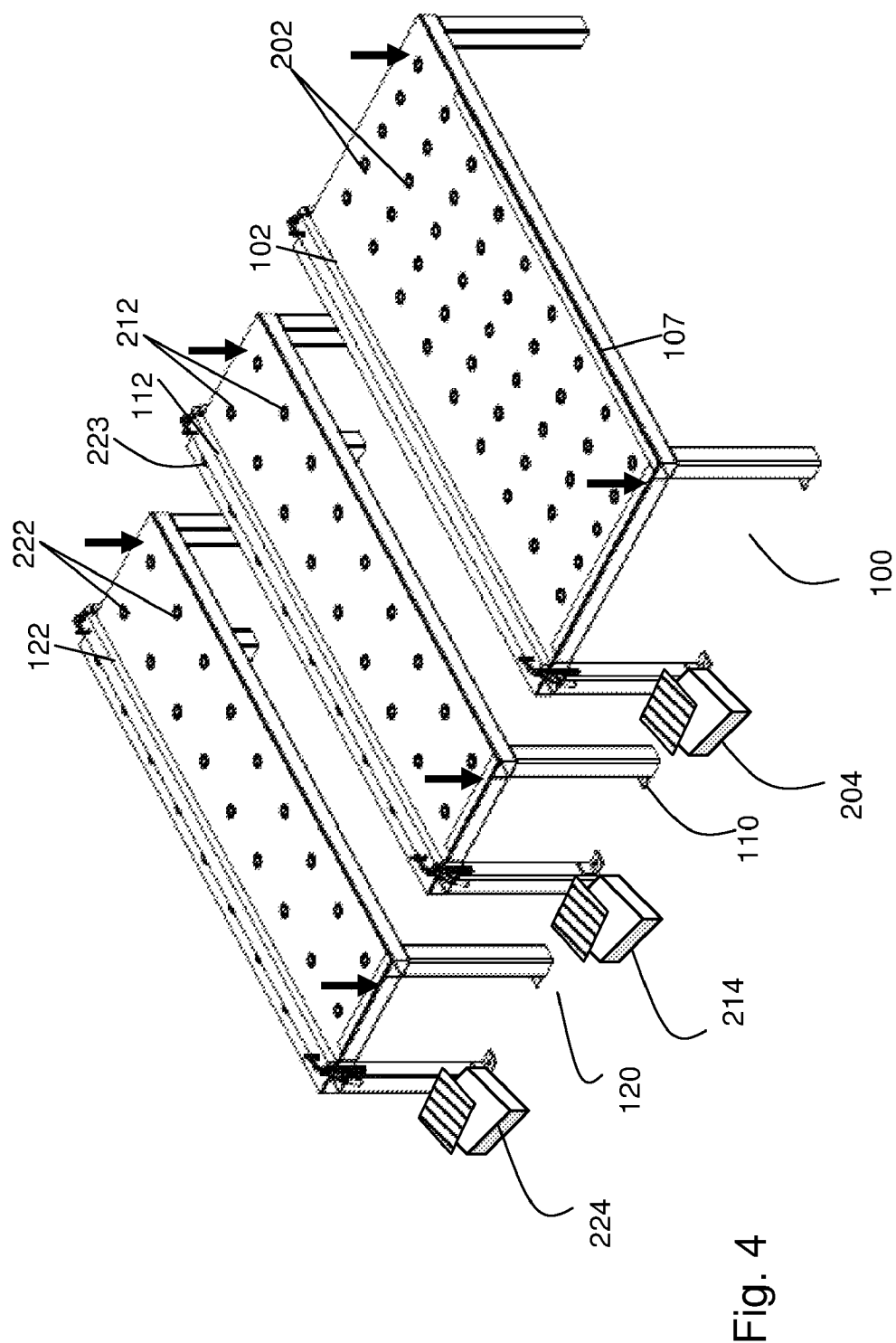
FIG. 4 is a perspective view illustrating the layout of a plurality of assembly tables in accordance with certain embodiments.

FIG. 4 is a three-dimensional perspective view of an exemplary embodiment of the manufacturing system of the present invention. The system shown in FIG. 4 is substantially similar to the first three tables shown in FIG. 3. FIG. 4 shows the plurality of locations that can include conveying elements of the conveying system for each table. In this embodiment, unidirectional rollers (e.g. ball rollers) are used. Unidirectional rollers are placed throughout the surface 101 of table 100 at positions 202. In this embodiment, rollers for the conveying system of table 110 are placed at positions 212. The rollers for the conveying system of table 120 are placed at the positions 222.

In other embodiments, the rollers at positions 202, 212, and 222 can be replaced with air vents (in embodiments that use an air flotation system), unidirectional wheels, or needle/cylinder rollers. In other embodiments, the conveying elements at positions 202, 212 and 222, can include low friction plates, such as nylon plates. In some embodiments, fewer or more conveying elements can be used than those shown in FIG. 4.

The rollers or other conveying elements at positions 202, 212, and 222 form conveying systems or transfer mechanisms for each of tables 100, 110, 120. Some or all of the conveying elements at these positions are retractable. The conveying systems or transfer mechanisms can therefore be thought of as having two states. In a first state, the conveying system for each table is enabled, allowing panels to freely move across the top of the table and be positioned by an operator for easy alignment. In a second state, the conveying elements of the conveying system or transfer mechanism are retracted such that the conveying elements are below or flush with the surface of each table. In this second state, panels are substantially held in place by friction with the surface of the table.

In some embodiments, the conveying systems or transfer mechanisms for tables 100, 110 and 120 operate independently. An operator can enable or retract the conveying system for table 100 independently of the conveying system for table 110. In some embodiments, each table has a separate switch 204, 214, and 224 located at each table, which operates the conveying system or transfer mechanisms for that table. In some embodiments, the switches 204, 214, and 224 are foot switches, which allow the operator to enable or retract the conveying system for a table while using both hands to manipulate the position and orientation of a panel.

In some embodiments, the switch for one table (e.g. 224) operates a portion 222 of that table 120, and also a portion 223 of the conveying system of the adjacent table 110. By including a portion 223 of the conveying system of adjacent table 110 with the conveying system 222 operated by the switch 224 of the table 120, all conveying elements that support a panel at the time a joint is to be formed can be retracted at the same time. For example, the conveying elements between the clamping mechanism of one table and the clamping mechanism of another table can be raised and lowered together to uniformly lower a panel to form a joint. This allows the portion of the panel nearest the joint to be supported by the conveying system until it is ready to be lowered to form a new joint. In embodiments where portions 222 and 223 adjacent tables are controlled by a single switch, these portions can be said to comprise a single conveying or transfer system. It will be appreciated that in some embodiments where portions of adjacent tables form a single conveying system, the tables need not be arranged such that the center of gravity of a panel rests above a table, because both ends of the panel are supported by the conveying or transfer mechanism prior to being lowered to form a joint. In other embodiments, the conveying system of each table retracts in response to the same switch for ease of construction.

In some embodiments, the switch that controls the state of the conveying system or transfer mechanisms for a table operates by controlling electrical signals to control actuators within each table. In some embodiments, these actuators operate directly on the elements within each conveying system. In other embodiments, the actuators controlled by the switches operate to control pneumatic valves to adjust the pneumatic pressure that controls the state of the elements within each conveying system. In other embodiments, the switches control hydraulic pumps or the like manipulate the hydraulic pressure that controls the state of the elements within each conveying system. In some embodiments, the switch includes a pneumatic valve and operates a pneumatic pressure directly. Other switching mechanisms suitable for the application can be used with the present invention as will be understood by person skilled in the art.

In some embodiments, supports may be adhered to the surface of the wall (e.g. to the surface of at least a subset of the panels forming the wall) during the manufacturing process. For example, many composite walls used dry freight trucks and trailers include support posts (e.g. z-posts) inside the walls. These support posts may be made of galvanized steel or other suitable materials and act like studs to add vertical strength, but could also be provided in other orientations, such as horizontally (e.g. along the length of the wall). These supports can also be used to attach fixtures to the inside of the walls of a truck or trailer, for example, providing rails and tie-downs for convenience.

To secure the supports to the composite wall, additional clamping mechanisms may be provided on some or all of the tables. For instance, in FIG. 4, the bold arrows indicate exemplary placement of these additional clamping mechanisms. These additional clamping mechanisms can be configured in a manner similar to the other clamping mechanisms described herein, or can include any suitable mechanism for securing supports to the wall while adhesive cures. In some embodiments, all the tables include these additional clamping mechanisms, but in other embodiments, the additional clamping mechanisms are available on a subset of the tables as determined by the preferred placement of the supports.

FIGS. 5A and 5B show cross-sectional views of an exemplary retractable roller 230. While only a single roller 230 is shown, it will be understood that each table may include multiple rollers to form a retractable transfer mechanism or conveying system. Exemplary retractable roller 230 is a unidirectional ball roller. Roller 230 includes a main roller ball 232 and housing 234 for the roller ball, which may include bearings or low friction surfaces to allow roller ball 232 to easily move while supporting a panel.

Ball roller 230 may be raised or lowered relative to the surface of the table along track 235. In some embodiments, track 235 includes a piston cylinder, such that when pneumatic pressure is applied, roller ball 232 rises above the surface of the table 101. In other embodiments, track 235 includes a hydraulic cylinder, such that hydraulic pressure raises and lowers housing 234. In other embodiments, track 235 can include electrical actuators to raise and lower housing 234. In some embodiments, roller 230, including track 235, is a self-contained unit that may be inserted into surface 101 of the table. In other embodiments, the roller 230 is integral with surface 101 such that track 235 is formed with cylinder walls comprising the material of surface 101. In some embodiments roller 230 is an off-the-shelf component, such as rollers that may be used with manufacturing systems in the prior art. It will be understood that roller 230 need not be a ball roller and can include other types of conveying structures, such as any of the conveying elements or rollers that are described throughout this application.

FIG. 5A depicts a first (e.g. enabled) state of a retractable roller 230 for use with a conveying system in table 100. In the state shown in FIG. 5A, roller ball 232 extends above the surface 101. This allows ball 232 to contact a panel above surface 101. In this state, a panel may be freely moved about the surface on the low friction rollers such as roller 230. In this state, a force underneath housing 234 and track 235 pushes the roller above surface 101 (e.g. by hydraulic, pneumatic, or electromechanical force).

Once an operator has successfully positioned a panel to align it with corner or edge guides and/or other panels, the operator can operate a switch to lower the panel as shown in FIG. 5B and form a joint. In a state shown in FIG. 5B, roller 230 is retracted below surface 101 and the transfer mechanism or conveyor system is not enabled (e.g. a disabled or retracted state). In this state, the top of roller ball 232 may be flush or below the top planar surface 101, shown by line 236. In this state, a panel that was previously resting on roller ball 232 now rests on surface 101. Therefore, the panel cannot be freely manipulated, as its movement is limited by friction between the panel and surface 101. To transition between the states shown in FIGS. 5A and 5B, the force in track 235 is reduced by the operation of switch such that roller ball 232 no longer supports the weight of a panel.

If a panel rests on rollers 230 when rollers 230 transition from the enabled state shown in FIG. 5A to the retracted state shown in FIG. 5B, the leading edge of the panel can be secured to an adjacent panel by the clamping mechanisms, such as those discussed throughout this application. Once a wall is formed by multiple panels and adhesives are cured or set, the operator may operate the switch to transition the rollers in a conveying system into the state shown in FIG. 5A. The operator may then take advantage of the low friction provided by the rollers to move the assembled wall off of the assembly tables.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of this disclosure. It is therefore intended that the appended claims be construed to cover all such equivalent variations as fall within the true spirit and scope of the invention.

What is claimed is:

1. A manufacturing system comprising:
a primary table including a corner guide; and
a plurality of secondary tables arranged in series, each secondary table comprising a plurality of retractable rollers and at least one clamping element;
wherein the plurality of secondary tables are arranged such that a plurality of panels can be moved by the retractable rollers and positioned such that each of the tables receives and supports at least a portion of at least one panel and such that joints between the plurality of panels are formed when at least a subset of the retractable rollers is lowered.

2. The manufacturing system of claim 1, wherein each of the at least one clamping elements is configured to secure a clamping bar over one of the joint to apply pressure to the panels that form the joint.

3. The manufacturing system of claim 2, wherein the clamping bar includes a bow to impart substantially uniform pressure along the joint.

4. The manufacturing system of claim 1, wherein at least one secondary table includes at least one additional clamping element configured to secure a support to a surface of a panel.

5. The manufacturing system of claim 1, further comprising a lift table for supplying the plurality of panels at substantially the same height as the plurality of secondary tables.

6. The manufacturing system of claim 1, further comprising a plurality of access spaces between the plurality of secondary tables to allow an operator to move between the plurality of secondary tables.

7. The manufacturing system of claim 1, wherein a subset of the plurality of retractable rollers of a first secondary table and a subset of the plurality of retractable rollers of a second, adjacent secondary table are configured to support and lower a panel substantially together.

8. The manufacturing system of claim 1, wherein the retractable rollers include a pneumatic adjustment mechanism that is controllable by a switch controlled by an operator.

9. The manufacturing system of claim 8, wherein the pneumatic adjustment mechanism comprises a foot switch that operates a subset of the plurality of retractable rollers of a first secondary table and a subset of the plurality of retractable rollers of a second, adjacent secondary table.

10. The manufacturing system of claim 1, wherein each of the plurality of secondary tables further comprise at least one edge guide to align the plurality of panels.

11. A manufacturing system comprising:
a first table and a second table, each table comprising a conveying system located in the surface of the table;
the first table being arranged to allow a first panel to move to the second table and to further receive a second panel such that the first and second panels align over the second table;
wherein each conveying system includes a first state, whereby the first or second panel can be conveyed above the surface of the table, and a second state, whereby the first or second panel rests on the surface of the table; and
wherein a joint is formed when at least a portion of the conveying system of the first table transitions to the second state such that the second panel is lowered to be substantially flush with the first panel.

12. The manufacturing system of claim 11, wherein the second table further comprises a clamping mechanism to apply pressure to the joint.

13. The manufacturing system of claim 12, wherein the clamping mechanism includes a bowed clamping bar to impart substantially uniform pressure along the joint.

14. The manufacturing system of claim 12, wherein the second table further comprises a second clamping mechanism configured to secure a support post to a surface of the first panel.

15. The manufacturing system of claim 11, wherein the first table is further arranged to allow space between the first and second tables for an operator to move between the tables.

16. The manufacturing system of claim 11, wherein the conveying system of the first table and the conveying system of the second table are configured such that a portion of each both conveying systems transitions substantially together.

17. The manufacturing system of claim 11, wherein each conveying system transitions between the first and second states by a change in a pneumatic pressure.

18. The manufacturing system of claim 11, wherein each conveying system transitions between the first and second states by a change in a hydraulic pressure.

19. The manufacturing system of claim 11, wherein each conveying system transitions between the first and second states in response to at least one switch activated by an operator.

20. The manufacturing system of claim 11, wherein each table further comprises at least one edge guide to align the first and second panels.

* * * * *